April 27, 1954

E. F. KLESSIG 2,676,463

POWER TRANSMISSION

Filed July 26, 1952

INVENTOR.
ERNST F. KLESSIG
BY
*Ralph L. Tweedale*
ATTORNEY

April 27, 1954    E. F. KLESSIG    2,676,463
POWER TRANSMISSION
Filed July 26, 1952    2 Sheets-Sheet 2

INVENTOR.
ERNST F. KLESSIG
BY
Ralph L. Tweedale
ATTORNEY

Patented Apr. 27, 1954

2,676,463

UNITED STATES PATENT OFFICE 2,676,463

POWER TRANSMISSION

Ernst F. Klessig, Berkley, Mich., assignor to Vickers Incorporated, Detroit, Mich., a corporation of Michigan Application July 26, 1952, Serial No. 301,135

16 Claims. (Cl. 60—52)

This invention relates to power transmissions, and is particularly applicable to those of the type comprising two or more fluid pressure energy translating devices, one of which may function as a pump and another as a fluid motor.

The invention is particularly concerned with hydraulic transmissions incorporating flow control devices for regulating flow rates and the speed of one or more motors in the transmission. Such controls are well known in the art, particularly as employed in hydraulic transmissions for machine tools. One type of flow control is illustrated in Patent No. 2,272,684 to Vickers and another type is illustrated in Patent No. 2,102,865 to Vickers. The use of such controls in panels for machine tools is illustrated in Patent No. 2,267,177 to Twyman and Patent No. 2,303,946 to Miller.

In the first type of flow control the pressure compensating valve is placed in series with a throttle and in operation modulates between the fully open and fully closed position to maintain a constant pressure drop across the throttle and thus maintain a constant flow rate. A relief valve cooperates therewith to constantly exhaust a proportion of the pump displacement in excess of what is required for maintaining the required speed of the motor.

In the second type of flow control the compensating valve is of the excess discharge type. The excess of pump displacement required for maintaining the controlled speed of the motor is exhausted by the compensating valve itself rather than a relief valve. A pilot relief valve may be utilized with compensating valves of the excess discharge type therein disclosed to cause the compensating valve to also function as a relief valve. In other types a separate main relief valve is utilized and the pressure compensating valve performs the sole function of flow rate regulation.

In both types of flow control devices, however, the flow rate may be varied by adjusting the throttle to change the area of the throttle opening. Thus a motor in the transmission may be controlled at one speed for one operation and at a different controlled speed for another operation. It is also possible to utilize the one flow control device for maintaining one motor at a controlled speed and at another time another motor in the same transmission at another controlled speed. The speed of each motor during its operation may be varied. This is accomplished by adjusting the throttle.

The use of hydraulic transmissions of this general type in the mobile equipment field presents problems not present in transmissions for driving machine tools. The pump may, for example, be driven from the engine of a tractor. Consequently in spite of utilizing a fixed displacement pump the displacement of the pump will vary according to engine speeds.

Hydraulic transmissions mounted on farm tractors for driving accessories or implements have become recognized as the simplest, the most efficient and the most economical method for driving said accessories. Several problems are presented, however, because of the nature of the various types of work to be performed. Each accessory has its own independent load requirements and it is practical in many instances to furnish a separate motor for each accessory. One of these motors may operate its implement most efficiently when supplied from a pump of a certain maximum displacement. Another motor may operate its load most efficiently when supplied from a pump having a greater maximum displacement. The problem of meeting the displacement requirements of each motor could be solved by utilizing a variable displacement type of pump. But this is impractical in the farming equipment field because of higher cost of such a pump. It is possible to utilize two fixed displacement pumps and provide a transmission which utilizes one pump to operate the motor having the smaller displacement requirement and both pumps to operate the motor having the higher displacement requirement.

It is also possible to utilize a pump in the transmission having a displacement which is greater than the displacement requirements of the largest motor and using in combination therewith a flow control device of the types recited. In this case, however, the pump must have a larger displacement than the total requirements of any motor. This is necessary because the control of flow rate by flow control devices of the type recited is acquired by blowing predetermined quantities of fluid either over a relief valve or through the compensating valve itself to achieve a controlled flow rate. The problem is further complicated because of the displacement of the pump will vary with the speed of the prime mover, namely the tractor engine.

It is therefor an object of this invention to provide in a hydraulic transmission systems having a fixed displacement pump and two hydraulic motors of different displacement requirements an improved flow regulating device for controlling the speed of either motor.

It is still another object of this invention to provide in a hydraulic transmission system having a fixed displacement pump and two hydraulic motors of different displacement requirements an improved flow regulating device for independently controlling the speed of either motor, and which may be adjusted to vary the speed of either motor and also adjusted to make such device inoperative in order to utilize the full displacement of the pump.

It is a further object of this invention to provide an improved, simplified, efficient and low cost flow control device.

Further objects and advantages of the present invention will be apparent from the following description, reference being had to the accompanying drawing wherein a preferred form of the present invention is clearly shown.

Figure 1:
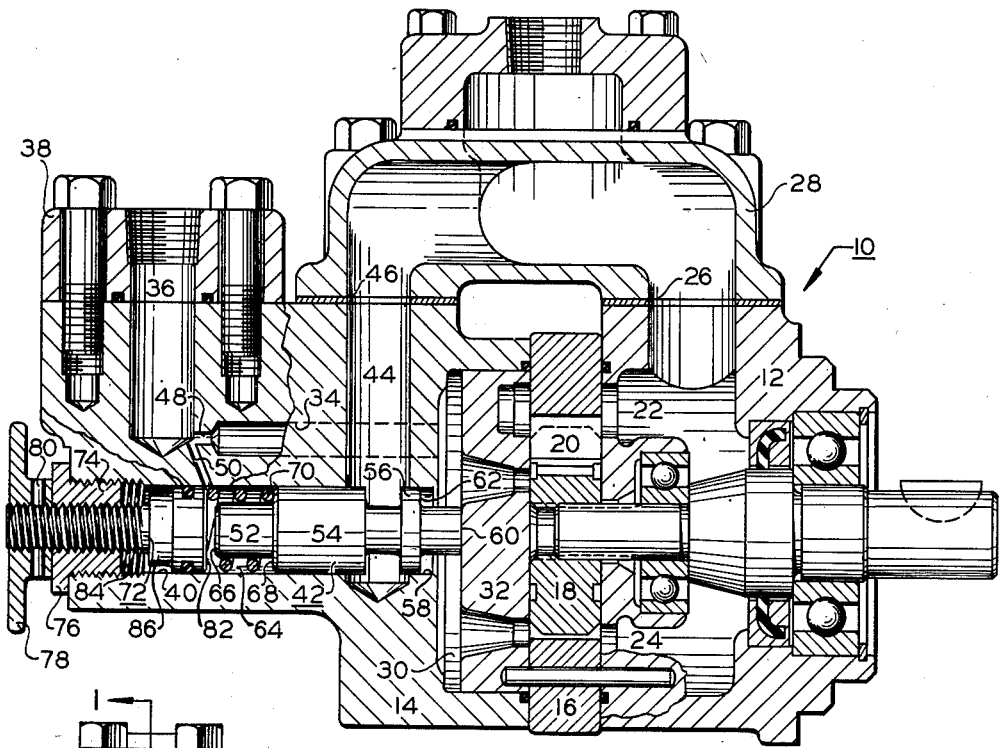
Figure 1 is a sectional view of a rotary fluid energy translating device embodying a preferred form of the present invention and taken on line 1—1 of Figure 2.
Figure 2:
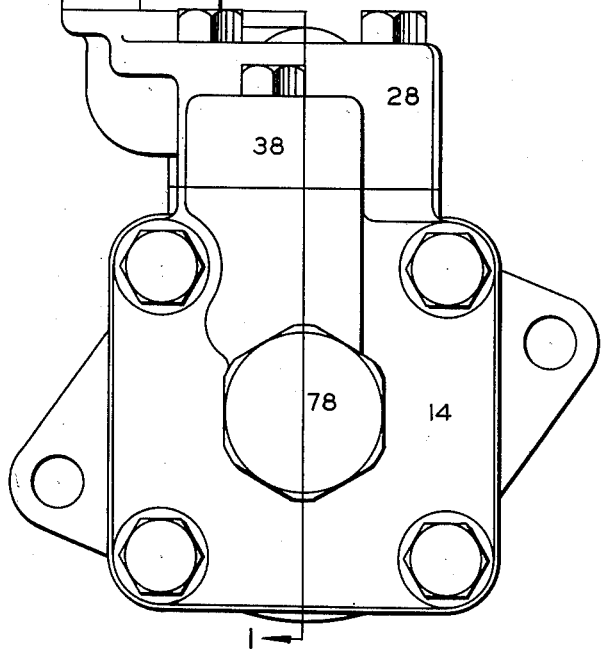
Figure 2 is an end view of the fluid energy translating device shown in Figure 1.

Referring to Figure 1, there is shown a rotary vane pump indicated generally by the numeral 10, the basic construction of which is of the type illustrated in the patent to Gardiner et al. No. 2,544,988. The body of the pump comprises an inlet section 12, an outlet section 14 and sandwiched between said sections a cam ring 16. Mounted within the ring 16 is a rotor 18 carrying reciprocating vanes 20. A branched inlet passage 22 and 24 connected to an inlet supply opening 26 of a manifold member 28 leads to the inlet working chamber of the pump. A pressure chamber 30 is formed in the outlet section 14 and within which is mounted a pressure plate 32, one side of which is maintained in fluid sealing engagement against the ring 16 and rotor 18 by pressure fluid in the chamber acting on the opposite side of the plate. The outlet working chambers of the pump are connected directly to the pressure chamber 30 by means of porting in the pressure plate. An outlet passage indicated generally by the numeral 34 leads from the pressure chamber 30 to an outlet port 36 in an outlet flange member 38.

A bore 40 is provided in the outlet section 14 which extends completely therethrough and opens to the pressure chamber. Mounted within the bore 40 is a flow regulating device of the excess discharge type indicated generally by the numeral 42. The device 42 when in operation is adapted to by-pass fluid in excess of the requirements of the controlled rate through a by-pass passage 44 which intersects the bore 40. The by-pass passage 44 leads to an opening 46 in the manifold member 28 which is connected to the inlet supply opening 26.

The outlet passage 34 is provided with a throttle 48 in the form of a fixed restriction formed in said passage and the outlet passage 34 is connected to the bore 40 beyond the throttle by a restricted cross passage 50.

The flow regulating device mounted in the bore 40 comprises a piston 52 having a large land 54 and a smaller land 56, the latter of which operates as a pressure compensating valve to control communication between the pressure chamber 30, which actually constitutes part of the outlet passage 34, and the bypass passage 44. The land or valve 56 while sliding in a sealing area of the bore 40, indicated by the numeral 58, closes said communication and when the right end portion of the valve passes over the edge of the sealing area communication is opened to the by-pass passage 44.

Balanced opposed operating surfaces are provided on the piston 52. One operating surface comprises the surface at the right end of piston 52 and the surface of land 56 facing the pressure chamber and indicated by the numerals 60 and 62. The other operating surface comprises the left end surface of piston 52 and the surface of land 54 facing a chamber 64, said surfaces being indicated by the numerals 66 and 68.

There is thus formed two balanced and opposed operating surfaces one of which is exposed to the pressure in the outlet passage ahead of the throttle and the other of which is exposed to pressure beyond the throttle in said passage. The compensating valve is adapted, when the flow rate is in excess of the rating of the throttle 48, to be operated in a manner to maintain the pressure drop across the throttle constant. The compression force, or loading of a spring 70 mounted in the chamber 64, determines the pressure drop across the throttle 48 to be maintained.

The spring 70 is placed in the chamber 64 with one end abutting the operating surface 68 of land 54 and the other end engaging an adjustable abutment member 72. The member 72 is threaded into a collar 74 the latter of which is threaded into the bore 40. The collar 74 is provided with a flange 76 which engages an end surface of the outlet section 14. A handle 78 is threaded on the abutment member 72 and is enabled to turn the abutment member 72 by means of a fastening pin 80.

In the position shown the compensating valve 56 is in an inoperative or ineffective position. The spring 70 urges the valve to the position shown. However, even if the pump were started in operation the valve would still be ineffective because of the end surface of the abutment member 72 indicated by the numeral 82 limiting the movement of the compensating valve. The member 72, in the position shown, has been adjusted so that the end surface 66 of the piston 52 engages the surface 82 of the abutment member 72 before the land or valve 56 has passed through the sealing area 58 of the bore 40. Thus with the valve 56 unable to by-pass any fluid it is ineffective or inoperative to regulate the flow rate.

The greatest maximum regulated flow rate is maintained by the valve when the abutment member is adjusted away from the piston to its maximum limit in engagement with a surface at the end of the collar 74 indicated by the numeral 84. A land 86 is provided on the abutment member 72 to engage the collar 74 and thus limit the maximum flow rate position of the member 72.

As previously stated the loading of the spring 70 determines the pressure drop across the throttle or fixed restriction 48. The compensating valve 56 when in operation constantly modulates when the displacement of the pump is above the rating of the throttle, between the fully open and fully closed position to discard fluid in quantities sufficient to maintain the pressure drop uniformly constant. By maintaining a uniformly constant pressure drop across the throttle, the flow rate through the outlet passage remains constant.

Instead of providing an adjustable throttle to vary the opening of the throttle and thus vary the pressure drop thereacross to vary the flow rate, the present invention provides the adjustable abutment member 72 which varies the compression force or loading of the spring. Thus the loading of the spring may be increased or decreased to respectively increase or decrease the pressure drop across the throttle and thus vary the flow rate. In the form of the invention illustrated the adjustment of the spring loading is limited.

It can be clearly seen that this eliminates an extra throttle bore and an adjustable throttle member together with its interrelated passages. A single bore only is necessary for mounting the compensating valve and for mounting this adjustment member. The compensating valve also is biased by the spring 70 into the pressure chamber in engagement against the pressure plate to urge said pressure plate in fluid sealing engagement against the ring and rotor. This is advantageous at starting of the pump when there is no pressure in the pressure chamber.

Although the pressure compensating valve has been illustrated as being mounted within a rotary pump it may be utilized in a separate body member having the basic passages illustrated.

Figure 3:
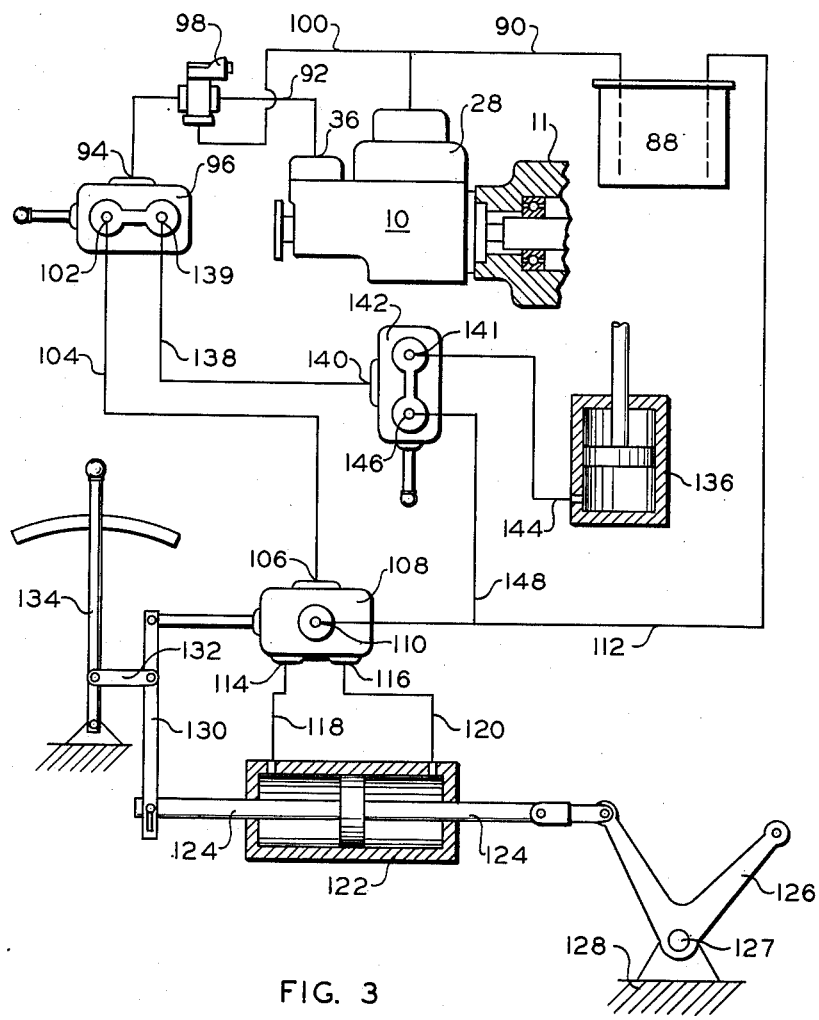
Figure 3 is a diagrammatic view of a hydraulic power transmission system embodying a preferred form of the present invention.

Referring to Figure 3, there is shown a hydraulic power transmission system incorporated within which is the pump 10 and flow regulating device mounted therein. The pump 10 is driven by a variable speed prime mover 11 such as a tractor engine. A tank 88 is connected by a supply conduit 90 to the manifold member 28. A delivery conduit 92 leading from the outlet or delivery port 36 in the flange member 38 is connected to the pressure port 94 of a three way directional control valve 96. A pressure relief valve of a suitable type, indicated by the numeral 98 is incorporated in the pressure delivery conduit 92. It will by-pass the pump delivery to the tank 88 at predetermined pressure increases through a relief conduit 100.

One of the motor ports 102 of the valve 96 is connected by a conduit 104 to the pressure port 106 of a four way directional valve 108. A return port 110 of the valve 108 is connected by a conduit 112 to the tank 88. The two motor ports 114 and 116 of the valve 108 are connected by conduits 118 and 120 to opposite ends of a double acting motor 122. A piston rod 124 extending from both ends of the motor is illustrated as being fastened at one end to a bell crank 126 pivoted, for example, on a rock shaft 127 which may be fastened to a tractor frame indicated generally at 128. The opposite end of the rod 124 is mechanically connected by linkage indicated generally by the numerals 130 and 132 to a shiftable control valve not shown, within the directional valve 108 and to a manually operated lever or handle 134 for operating the shiftable control valve. While this is shown as manually operable it is intended as representative of any other well known means for input control such as automatic draft controls, depth controls, etc. The linkage illustrated is a conventional follow up linkage to provide directional operation of the motor by manual operation of the valve and a following action of the valve to an open center position when the motor has been operated to a position governed by the length of movement of the lever or handle 134.

The motor 122 may drive through the bell crank 126 a plowing implement and should be considered as requiring a delivery from the pump less than the full displacement of said pump for most efficient operation of the plowing implement.

For the purpose of driving another load device, such as a front end loader, there is shown another single acting motor 136. A pressure delivery line 138 connects the other motor port 139 of the three way valve 96 to the pressure port 140 of a three way valve 142 for controlling the direction of operation of the motor 136. The motor port 141 of the valve 142 is connected to the lower end of the motor 136 by a conduit 144, and a return port 146 of the valve 142 is connected to tank 88 by a conduit 148. The motor 136 may be considered as requiring, for most efficient operation of the load device, that the full displacement of the pump be delivered thereto no matter what the speed of the prime mover.

In operation, if it is desired to operate the motor 122 for operating the plowing implement, the control valve 96 is manually operated to a position connecting the pressure port 94 thereof to the motor port 102. The lever 134 of the directional valve 108 will be shifted to a position commensurate with the plowing depth desired. It is desired that a controlled rate of fluid be delivered to the motor. In systems having draft controls, etc., the ride of the tractor is also affected if the delivery rate to the fluid motor operating the plowing implement is not controlled. The handle 78 of the adjustable abutment member 72 is rotated so that the abutment member 72 is moved away from the compensating valve piston 52 sufficient to provide a proper loading of the spring 70. The loading of the spring 70 will produce a pressure drop across the restriction 48 in amount sufficient to provide the proper flow rate to the motor 122. Also, when in operation, when the soil conditions differ and it is desirable to slightly increase or decrease the fluid delivery to the motor 122 the handle 78 may be rotated to increase or decrease the spring loading and thus vary the pressure drop across the throttle 48. With an increase in spring loading the pressure drop will increase and thus the flow rate to the motor will be increased. When the spring loading is decreased the pressure drop across the restriction 48 is decreased and the flow rate to the motor will be decreased.

With the abutment member adjusted so that the surface 82 no longer interferes with the compensating valve piston 52 the compensating valve 52 will be operated to positions constantly by-passing excess fluid displacement from the pump 10. Excess fluid is by-passed from the pressure chamber 30 to the by-pass passage 44 in quantities sufficient to maintain the desired pressure drop across the restriction 48. The desired quantity of fluid from the pump 10 to maintain proper control of the motor 122 will be delivered to said motor by means of outlet passages 34 and 36, conduit 92, valve 96 and conduit 104 to the pressure port 106 of directional valve 108 and thence through conduit 118 to the left end of motor 122. Fluid displaced from the motor is returned to tank 88 by conduit 120, motor and return ports 116 and 110 of valve 108 and conduit 112. When the motor has been operated to a position commensurate with proper plowing depth the valve 108 will have been operated by the follow up linkage to its neutral position. Where draft controls and other mechanisms are utilized in the system the pump which is being constantly driven by the prime mover will deliver the motor when required no more than the required controlled rate. When it is desired to raise or lift the element the lever or handle 134 is manually operated in the reverse direction. Pressure fluid from the pump 10 is now delivered to the opposite end of the motor at the same controlled rate.

If it is desired to operate the motor 136 to drive, for example, a loader, the three way valve 96 is operated to connect the pressure port 94 thereof to the motor port 139. The three way valve 142 is shifted to connect conduit 138 to conduit 144. With an implement of the type recited it is desired to take full advantage of the full displacement of the pump 10 no matter what the speed of the prime mover. In order to achieve this result the handle 78 of the adjustable abutment member 72 is rotated to the position shown in Figure 1. In the position shown the flow of control device is inoperative. The valve 56 is permitted to shift slightly but not enough to open the pressure chamber 30 to by-pass 44. The valve 56 is not permitted to shift beyond the limits of the sealing area within the valve bore. It is preferable not to screw the adjustment member in contact with the surface 66 to make the flow control device inoperable. It could be negligently screwed down too tightly and damage the pressure plate or the valve. Thus, the lower portion of the handle member 78 is adapted to abut the collar 76 when the inoperative position of the valve has been reached and before engagement of the surface 82 with the valve surface 66. The arrangement is also adapted to leave sufficient sealing area. The spring 70 cooperates in shifting the valve to the inoperative position.

The full displacement of the pump 10 is delivered through conduit 92 to the pressure port 94 of valve 96 and by port 139 of said valve and conduit 138 to the pressure port 140 of valve 142. Fluid is delivered to the lower end of motor 136 by means of conduit 144.

With the compensating valve 56 inoperative the pressure drop across the restriction 48 is uncontrolled and thus fluid at an uncontrolled rate is delivered to the motor 136 but at a desirable rate equal to the full displacement of the pump 10.

There is thus disclosed a hydraulic system admirably suited for the mobile equipment field. Where there are a plurality of motors to be driven from a single pump with the motors having different load and fluid displacement requirements the flow control device mounted in the pump 10 provides a regulation to meet various requirements. It is particularly adaptable when it is required that one of the motors is to be supplied at a controlled rate less than full displacement of the pump and it is required that the other motor be supplied at an uncontrolled rate equal to the full capacity of the pump.

When it is desired to provide a controlled flow rate an adjustment may be made to the flow regulating device to provide the controlled rate. This adjustment is expediently, simply and economically made by adjusting an abutment member located in the same bore as the pressure compensating valve and conveniently available for the manual adjustment externally of the valve body. The adjustment contrary to prior custom does not adjust a throttle opening but adjusts or changes the loading of an operating spring to change the pressure drop across a fixed throttle or restriction. In this manner there is a saving of extra machining and labor costs by eliminating an adjustable throttle bore and interrelated passages and also the saving of the cost of the adjustable throttle and assembly of the same. The reduction or elimination of such costs are tremendously important in the mobile equipment field, particularly in the farm tractor accessory field.

The system and valve provide the very desirable feature that the full displacement of the pump may be utilized for operating accessories driven by motors requiring such displacement. In such cases, the same adjustable abutment member is utilized to prevent the pressure compensating valve from operating and thus make the flow regulating device ineffective or inoperative. Once the control of the pressure drop across the fixed throttle has been eliminated or removed the system permits full displacement of the pump, no matter what the speed of the prime mover, to be delivered to the motor.

There are other farming implements such as discs, cultivators, light and heavy loaders, graders and scoops, where the motor displacement requirements may differ slightly. The invention is adequate to handle efficiently the requirements of said systems.

Where a controlled movement is necessary and it is necessary to slightly vary the rate because of a difference in soil conditions or to correct jerky actions or ride of the tractor, the flow control device may be adjusted within limits to provide a proper controlled rate of delivery to the motors driving the accessories. When it is convenient to utilize the full displacement of the pump to provide a faster action and where uncontrolled movement is not detrimental, the flow regulating device may be simply adjusted to make the flow regulating device completely inoperative to utilize the full displacement of the pump.

While the form of embodiment of the invention as herein disclosed constitutes a preferred form, it is to be understood that other forms might be adopted, all coming within the scope of the claims which follow.

What is claimed is as follows:

1. A flow control device comprising a body member having a flow passage, a fixed throttle in the flow passage, a bore in the body member opening to one surface thereof, a pressure compensating valve shiftably mounted in the bore and including operating means comprising a spring for biasing the valve and surfaces exposed to the pressures ahead of and beyond the throttle, said operating surfaces and spring causing the valve to modulate for regulating the pressure drop across the throttle and thus maintaining a regulated flow rate through the flow passage, the loading of the spring determining the pressure drop across the throttle, an adjustable abutment member in the compensating valve bore engaging the spring for determining the loading of the spring, and means carried by the member extending from the opening of the bore for externally adjusting the abutment member to vary the spring loading and thus vary the pressure drop across the throttle.

2. A flow control device comprising a body member having a flow passage, a bypass leading from the flow passage, a fixed throttle in the flow passage, a bore in the body member opening to one surface thereof, a pressure compensating valve of the excess discharge type shiftably mounted in the bore and including operating means comprising a spring for biasing the valve and surfaces exposed to the pressures ahead of and beyond the throttle, said operating surfaces and spring causing the valve to modulate and bypass fluid in sufficient quantities from the flow passage to the bypass for regulating the pressure drop across the throttle and thus maintaining a regulated flow rate through the flow passage, the loading of the spring determining the pressure drop across the throttle, an adjustable abutment member in the compensating valve bore engaging the spring for determining the loading of the spring, and means carried by the member extending from the opening of the bore for externally adjusting the abutment member to vary the spring loading and thus vary the pressure drop across the throttle.

3. A flow control device comprising a body member having a flow passage, a fixed throttle in the flow passage, a bore in the body member opening to one surface thereof, a pressure compensating valve shiftably mounted in the bore and including operating means comprising a spring for biasing the valve and surfaces exposed to the pressures ahead of and beyond the throttle, said operating surfaces and spring causing the valve to modulate for regulating the pressure drop across the throttle and thus maintaining a regulated flow rate through the flow passage, the loading of the spring determining the pressure drop across the throttle, and an adjustable abutment member in said bore engaging said spring at one end and extending from the bore at its opposite end, said member being externally adjustable for both varying the loading of the spring and for causing said compensating valve to be completely ineffective.

4. A flow control device comprising a body member having a flow passage, a bypass leading from the flow passage, a fixed throttle in the flow passage, a bore in the body member opening to one surface thereof, a pressure compensating valve of the excess discharge type shiftably mounted in the bore and including operating means comprising a spring for biasing the valve and surfaces exposed to the pressures ahead of and beyond the throttle, said operating surfaces and spring causing the valve to modulate and bypass fluid in sufficient quantities from the flow passage to the bypass for regulating the pressure drop across the throttle and thus maintaining a regulated flow rate through the flow passage, the loading of the spring determining the pressure drop across the throttle, and an adjustable abutment member in said bore engaging said spring at one end and extending from the bore at its opposite end, said member being externally adjustable for both varying the loading of the spring and for causing said compensating valve to be completely ineffective.

5. In a fluid pump of the fixed displacement type including a body member having a fluid delivery passage, the combination of a fixed throttle in the delivery passage, a bore in the body member opening to one surface thereof, a pressure compensating valve shiftably mounted in the bore and including operating means comprising a spring for biasing the valve and surfaces exposed to the pressures ahead of and beyond the throttle, said operating surfaces and spring causing the valve to modulate for regulating the pressure drop across the throttle and thus maintaining a regulated flow rate through the flow passage, the loading of the spring determining the pressure drop across the throttle, an adjustable abutment member in the compensating valve bore engaging the spring for determining the loading of the spring, and means carried by the member extending from the opening of the bore for externally adjusting the abutment member to vary the spring loading and thus vary the pressure drop across the throttle.

6. In a fluid pump of the fixed displacement type including a body member having a fluid delivery passage, the combination of a bypass leading from the delivery passage, a fixed throttle in the delivery passage, a bore in the body member opening to one surface thereof, a pressure compensating valve of the excess discharge type shiftably mounted in the bore and including operating means comprising a spring for biasing the valve and surfaces exposed to the pressures ahead of and beyond the throttle, said operating surfaces and spring causing the valve to modulate and bypass fluid in sufficient quantities from the delivery passage to the bypass for regulating the pressure drop across the throttle and thus maintaining a regulated flow rate through the delivery passage, the loading of the spring determining the pressure drop across the throttle, an adjustable abutment member in the compensating valve bore engaging the spring for determining the loading of the spring, and means carried by the member extending from the opening of the bore for externally adjusting the abutment member to vary the spring loading and thus vary the pressure drop across the throttle.

7. In a fluid pump of the fixed displacement type including a body member having a fluid delivery passage, the combination of a bypass in the body member leading from the delivery passage, a fixed throttle in the delivery passage, a bore in the body member opening to one surface thereof, a pressure compensating valve shiftably mounted in the bore and including operating means comprising a spring for biasing the valve and surfaces exposed to the pressures ahead of and beyond the throttle, said operating surfaces and spring causing the valve to modulate for regulating the pressure drop across the throttle and thus maintaining a regulated flow rate through the delivery passage, the loading of the spring determining the pressure drop across the throttle, and an adjustable abutment member in said bore engaging said spring at one end and extending from the bore at its opposite end, said member being externally adjustable for both varying the loading of the spring and for causing said compensating valve to be completely ineffective.

8. In a fluid pump of the fixed displacement type including a body member having a fluid delivery passage, the combination of a fixed throttle in the delivery passage, a bore in the body member opening to one surface thereof, a pressure compensating valve shiftably mounted in the bore and including operating means comprising a spring for biasing the valve and surfaces exposed to the pressures ahead of and beyond the throttle, said operating surfaces and spring causing the valve to modulate for regulating the pressure drop across the throttle and thus maintaining a regulated flow rate through the delivery passage, the loading of the spring determining the pressure drop across the throttle, and an adjustable abutment member in said bore engaging said spring at one end and extending from the bore at its opposite end, said member being externally adjustable for both varying the loading of the spring and for causing said compensating valve to be completely ineffective.

9. A flow control device comprising a body member having a flow passage, a fixed throttle in the flow passage, a bore in the body member opening to one surface thereof, a pressure compensating valve shiftably mounted in the bore and including operating means comprising a spring for biasing the valve and operating surfaces exposed to pressures ahead of and beyond the throttle, said operating surfaces and spring causing the valve to modulate for regulating the pressure drop across the throttle and thus maintaining a regulated flow rate through the passage, the loading of the spring determining the pressure drop across the throttle, a piston in said bore, one end of which engages the spring and the opposite end of which extends from the bore for manually adjusting the piston to determine the loading of the spring, said piston being adjustable to a position that the end engaging the spring forms an abutment preventing the compensating valve from operating and thus causing the same to be ineffective.

10. A flow control device comprising a body member having a flow passage with a bypass leading therefrom, a fixed throttle in the flow passage, a bore in the body member opening to one surface thereof, a pressure compensating valve of the excess discharge type shiftably mounted in the bore and including operating means comprising a spring for biasing the valve and operating surfaces exposed to pressures ahead of and beyond the throttle, said operating surfaces and spring causing the valve to modulate for discarding fluid from the flow passage to the bypass in quantities sufficient to regulate the pressure drop across the throttle to maintain a regulated flow rate through the flow passage, the loading of the spring determining the pressure drop across the throttle, a piston in said bore, one end of which engages the spring and the opposite end of which extends from the bore for manually adjusting the piston to determine the loading of the spring, said piston being adjustable to a position that the end engaging the spring forms an abutment preventing the compensating valve from opening the bypass to the flow passage and thus causing the same to be inoperative.

11. In a hydraulic power transmission system having a fixed displacement fluid pump driven from a variable speed prime mover and two fluid motors each of which is adapted to be independently operated by the pump, it being a requirement that one motor be driven at a controlled speed effected by less than full displacement of the pump and that the other motor be driven at an uncontrolled speed effected by full displacement of the pump, no matter what the speeds of the prime mover, the combination of a flow regulating device through which the delivery of the pump must pass on its path to either motor and a single manually adjustable means for said flow regulating device for both controlling the delivery flow rate to one of said motors and for causing said flow regulating device to be completely inoperative to therefore permit the full displacement of the pump to be delivered to the other of said motors.

12. In a hydraulic power transmission system having a fixed displacement fluid pump driven from a variable speed prime mover and two fluid motors each of which is adapted to be independently operated by the pump, it being a requirement that one motor be driven at a controlled speed effected by less than full displacement of the pump and that the other motor be driven at an uncontrolled speed effected by full displacement of the pump, no matter what the speeds of the prime mover, the combination of a pressure compensating valve and a fixed throttle through which the delivery of the pump must pass on its path to either motor, said compensating valve including spring biasing means for determining the pressure drop across the throttle and being responsive to the pressure ahead of and beyond the throttle for maintaining a regulated pressure drop across the throttle, means for adjusting the spring loading to control the delivery to one of said motors by controlling the pressure drop across the throttle, and means for causing said pressure compensating valve to be completely inoperative therefore permitting full displacement of the pump to the other fluid motor.

13. In a hydraulic power transmission system having a fixed displacement fluid pump driven from a variable speed prime mover and two fluid motors each of which is adapted to be independently driven by the pump, one of said motors to be driven at a controlled speed and the other motor at an uncontrolled speed commensurate with the full displacement of the pump no matter what the speed of the prime mover, the combination of a pressure compensating valve of the excess discharge type and a fixed throttle for maintaining a controlled speed of one of the motors, and adjustment means for the compensating valve to cause the same to be completely inoperative therefor permitting operation of the other motor from the full displacement of the pump.

14. In a hydraulic power transmission system having a fixed displacement fluid pump driven from a variable speed prime mover and two fluid motors each of which is adapted to be independently driven by the pump, one of said motors to be driven at a controlled speed and the other motor at an uncontrolled speed commensurate with the full displacement the pump no matter what the speed of the prime mover, the combination of a pressure compensating valve of the excess discharge type and a fixed throttle through which delivery from the pump must pass on its path to either motor, said compensating valve maintaining a regulated pressure drop across the throttle by discarding excess fluid from the pump in quantitites sufficient to maintain a controlled flow rate to one of the motors, said compensating valve including an operating spring the loading of which determines the pressure drop across the throttle, adjustable means for varying the spring loading to control the pressure drop across the throttle, and means for causing the compensating valve to be completely inoperative therefore permitting the conducting of the full displacement of the pump to the other motor.

15. In a hydraulic power transmission system having a fixed displacement fluid pump driven from a variable speed prime mover and two fluid motors each of which is adapted to be independently driven by the pump, one of said motors to be driven at a controlled speed and the other motor at an uncontrolled speed commensurate with the full displacement of the pump no matter what the speed of the prime mover, the combination of a pressure compensating valve of the excess discharge type and a fixed throttle through which delivery from the pump must pass on its path to either motor, said compensating valve maintaining a regulated pressure drop across the throttle by discarding excess fluid from the pump in quantities sufficient to maintain a controlled flow rate to one of the motors, said compensating valve including an operating spring, the loading of which determines the pressure drop across the throttle, and a single manually adjustable abutment member for both varying the loading of the spring to establish a pressure drop across the throttle commensurate with the controlled speed requirements of one of the motors and for also causing the compensating valve to be completely inoperative therefore permitting full displacement of the pump to be delivered to the other motor.

16. In a hydraulic power transmission having a fixed displacement fluid pump driven from a variable speed prime mover and two fluid motors each of which is adapted to be independently operated by the pump, it being a requirement that the flow rate to one motor be controlled at a rate less than full displacement of the pump and that the other motor be driven at a rate effected by full displacement of the pump no matter what the speed of the prime mover, the combination of a flow regulating device including a pressure compensating valve for by-passing quantities of fluid in excess of system requirements, and a single manually adjustable control means associated with the flow regulating valve for controlling the compensating valve to effect the required controlled rate of flow to one of said motors and for also causing the compensating valve to be completely inoperative to therefore permit delivery of full displacement from the pump to the other motor.

References Cited in the file of this patent

UNITED STATES PATENTS

| Number | Name | Date |
|---|---|---|
| 2,570,351 | Klessig | Oct. 9, 1951 |
| 2,573,563 | Gardiner | Oct. 30, 1951 |